US008412856B2

(12) United States Patent
Thaler

(10) Patent No.: US 8,412,856 B2
(45) Date of Patent: Apr. 2, 2013

(54) FILE INPUT/OUTPUT SCHEDULER USING IMMEDIATE DATA CHUNKING

(75) Inventor: Andrew R. Thaler, Brecksville, OH (US)

(73) Assignee: Sony Computer Entertainment America LLC., Foster City, CA (US)

( * ) Notice: Subject to any disclaimer, the term of this patent is extended or adjusted under 35 U.S.C. 154(b) by 95 days.

(21) Appl. No.: 12/902,768

(22) Filed: Oct. 12, 2010

(65) Prior Publication Data

US 2011/0099204 A1    Apr. 28, 2011

Related U.S. Application Data

(60) Provisional application No. 61/255,013, filed on Oct. 26, 2009.

(51) Int. Cl.
*G06F 3/00* (2006.01)

(52) U.S. Cl. ......... 710/5; 710/1; 710/6; 710/29; 710/30; 710/33

(58) Field of Classification Search .................. 710/1, 5, 710/6, 29, 30, 33
See application file for complete search history.

(56) References Cited

U.S. PATENT DOCUMENTS

| 7,069,555 | B1 | 6/2006 | Tzen |
| 7,472,384 | B1 | 12/2008 | Beloussov et al. |
| 7,730,222 | B2 * | 6/2010 | Passerini ........................... 710/5 |
| 7,904,192 | B2 * | 3/2011 | Chua et al. ..................... 700/100 |
| 2005/0044190 | A1 * | 2/2005 | Kawada et al. ............... 709/221 |
| 2005/0066118 | A1 * | 3/2005 | Perry et al. ..................... 711/112 |
| 2005/0108414 | A1 | 5/2005 | Taylor et al. |
| 2005/0207419 | A1 * | 9/2005 | Kohzuki et al. ................ 370/392 |
| 2006/0047903 | A1 * | 3/2006 | Passerini ........................ 711/114 |
| 2006/0136570 | A1 | 6/2006 | Pandya |
| 2006/0200647 | A1 * | 9/2006 | Cohen ............................. 712/34 |
| 2007/0150624 | A1 | 6/2007 | Moore et al. |
| 2008/0091849 | A1 | 4/2008 | Hayashi et al. |
| 2008/0120435 | A1 | 5/2008 | Moreira et al. |
| 2009/0019459 | A1 * | 1/2009 | Rowan et al. .................. 719/328 |

FOREIGN PATENT DOCUMENTS

CN       101187906     5/2008

OTHER PUBLICATIONS

PCT International Search Report for International Application No. PCT/US10/52698 mailed Dec. 10, 2010.
Office Action dated Apr. 24, 2012 in Korean Patent Application No. 10-2010-7026222.
U.S. Appl. No. 61/255,013, filed Oct. 26, 2009.

(Continued)

*Primary Examiner* — Chun-Kuan Lee
*Assistant Examiner* — Jasjit Vidwan
(74) *Attorney, Agent, or Firm* — Joshua D. Isenberg; JDI Patent

(57) ABSTRACT

An input/output (I/O) method, system, and computer program product are disclosed. An incoming I/O request is received from an application running on a processor. A tree structure including processor-executable instructions defines one or more layers of processing associated with the I/O request. The instructions divide the data in the I/O request into one or more chunks at each of the one or more layers of processing. Each instruction has an associated data dependency to one or more corresponding instructions in a previous layer. The instructions are sorted into an order of processing by determining a location of each chunk and data dependencies between chunks of different layers of processing. One or more instructions are inserted into a schedule that depends at least partly on the order of processing. The I/O request is serviced by executing the instructions according to the schedule with the processor according to the order of processing.

45 Claims, 5 Drawing Sheets

OTHER PUBLICATIONS

"Cell Broadband Engine Architecture", International Business Machines Corporation, Sony Computer Entertainment Incorporated, Toshiba Corporation, Aug. 8, 2005.

Chinese First Office Action mailed date Dec. 3, 2012, issued for Chinese Patent Application No. 201080001671.X.

* cited by examiner

FILE INPUT/OUTPUT SCHEDULER USING IMMEDIATE DATA CHUNKING

PRIORITY CLAIM

This application claims the benefit of priority of U.S. provisional application No. 61/255,013, to Andrew R. Thaler, entitled FILE INPUT/OUTPUT SCHEDULING USING IMMEDIATE DATA CHUNKING, filed Oct. 26, 2009, the entire disclosures of which are incorporated herein by reference.

FIELD OF THE INVENTION

Embodiments of this invention are related to computer gaming and related applications and more specifically to file input/output (I/O) management in computer gaming and related applications.

BACKGROUND OF THE INVENTION

Many software applications, such as video games, include a file input/output (I/O) scheduler to make media access within an application more efficient and reliable. A file I/O system (FIOS) is a middleware layer for accessing files with several parts including a scheduler and optional I/O filter layers. The scheduler is typically designed to optimally sort I/O requests so that they complete in the shortest possible time subject to arbitrary deadline and priority constraints. The filter layers may provide additional services such as decompression or caching.

Many different game components require I/O access to files in storage media. Audio components load audio files; game-play engines load level definitions; graphics components load texture maps and models; movie components load audio-visual files; and subsystems load large WAD files. The media may be game-delivery media such as optical discs (universal media disc (UMD), compact disc (CD), digital video disc (DVD), Blu-Ray disc, etc.), intermediate storage media such as hard disks, or other media types as platforms evolve.

A single application, such as a video game, typically has multiple components, each component having its own I/O requirements. Some require streaming access to media, where the I/O system streams data in the file to the component so the component can present the streamed data in succession to the game player. For example, an audio component typically streams an audio file for soundtrack playback; a movie component streams audio-video content to play back a movie for the player. Other components need only non-streaming access where they retrieve data from the file in portions, referred to herein as chunks, for the component to process. Although these components do not require steady data flow in order to process, timing of the delivery of the chunks is often crucial. If an application doesn't receive data when it is needed, performance may suffer.

Currently, chunking (i.e., breaking data for an I/O request into portions/chunks) occurs during execution of the I/O request. Data dependencies between chunks are not determined prior to execution, and this leads to inefficiencies in the processing of I/O requests. For example, a given I/O request may require data that needs to be both decrypted and decompressed before transfer. The I/O system may require that decryption of a given chunk occur before decompression, but different chunk sizes may be associated with decryption and decompression. For example, the chunk sizes associated with decryption may have a fixed value such as 64 Kilobytes, whereas the chunk sizes associated with decompression may be variable. Thus, without determining the data dependencies between the chunks being decrypted and the chunks being decompressed, an entire file must be decrypted before the file can be decompressed, rather than initiating decompression of a given chunk once the necessary decrypted chunks have been processed.

Similarly, a given I/O request that requires data to be retrieved from multiple media sources may be processed inefficiently with the current form of chunking during execution. Without determining the data dependencies between chunks prior to execution, a media device may sit idle while data from another media device is being processed, when it is theoretically possible for data from both media devices to be processed simultaneously. This ultimately slows down the functionality of a video game or other application.

Furthermore, video games often perform a considerable amount of I/O. Game events are often time driven with deadlines that must be met. For example, if a player is traveling from point A to point B, the game needs to have the files for data associated with point B loaded before the player gets there. Game components can use low-level I/O primitives to retrieve data from media, but these primitives don't handle device contention when multiple components require data from the same device at the same time. Jammed-up I/O requests can interrupt streaming data flow or prohibit critical data chunks from getting to a component when needed.

Because an application's components typically are not aware of each other's I/O activities, their I/O requests often result in highly inefficient I/O patterns with a substantial amount of overseeking (back and forth searches for data). As games grow larger, overseeking and inefficient data retrieval increase.

It is within this context that embodiments of the present invention arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, embodiments of the invention described below are set forth without any loss of generality to, and without imposing limitations upon, the claimed invention. Embodiments of the present invention may be implemented around a file I/O system (FIOS) that provides a centralized layer that all I/O for a system passes through. The FIOS may include instructions that create a tree structure for optimal processing of each individual I/O request, and instructions that schedule I/O requests and determine an order in which to service the I/O requests most efficiently.

Figure 1:
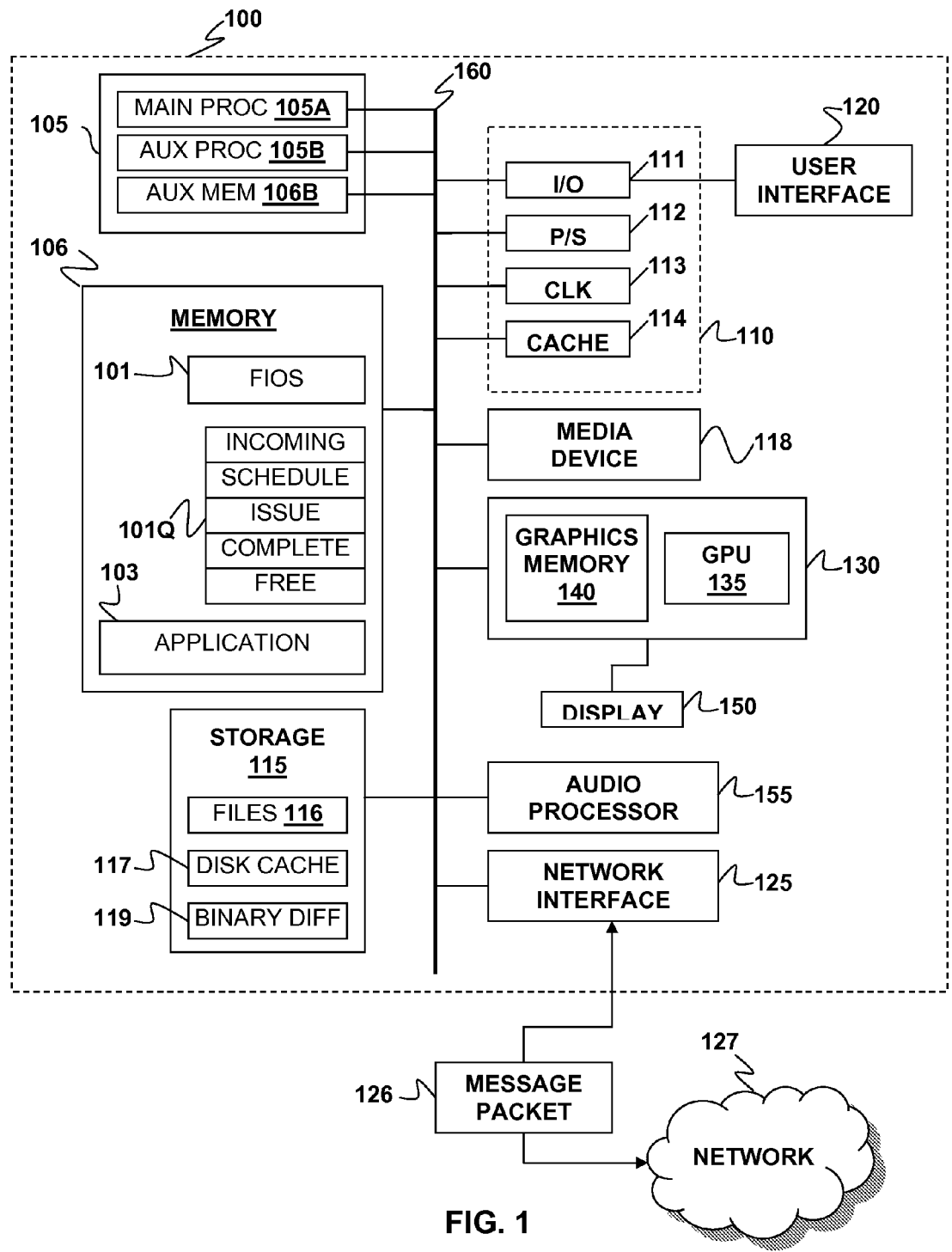
FIG. 1 is a block diagram of a system that implements a file I/O system (FIOS) according to an embodiment of the present invention.

By way of example, a computer implemented system 100 may be configured to implement a file I/O system (FIOS) according to an embodiment of the present invention as shown in FIG. 1. By way of example, and without loss of generality, the system 100 may be implemented as a personal computer, video game console, hand-held game device, cellular telephone, personal digital assistant, or other digital device, suitable for practicing embodiments of the invention. The system 100 may include a processing unit 105 and a main memory 106 coupled to the processing unit 105. The CPU 105 may be configured to run software applications and, optionally, an operating system. Some embodiments of the present invention may take advantage of certain types of processor architecture in which the CPU 105 includes a main processor 105A and an auxiliary processor 105B having its own associated local memory 106B. One example, among others of such a processor architecture is a Cell Processor. An example of a Cell Processor architecture is described in detail, e.g., in *Cell Broadband Engine Architecture*, copyright International Business Machines Corporation, Sony Computer Entertainment Incorporated, Toshiba Corporation Aug. 8, 2005 a copy of which may be downloaded at http://cell.s-cei.co.jp/, the entire contents of which are incorporated herein by reference.

The main memory 106 may store applications and data for use by the CPU 105. The main memory 106 may be in the form of an integrated circuit, e.g., RAM, DRAM, ROM, and the like. A computer program 101 may be stored in the memory 106 in the form of instructions that can be executed on the processor 105. The instructions of the program 101 may be configured to implement amongst other things, a file input/output system (FIOS) having certain features described below. The memory 106 may contain I/O queues 101Q, e.g., in the form of stacks or queues for incoming, scheduled, issued, completed, and free I/O requests that are used by the FIOS program 101. Examples of such queues are also described below.

By way of example, the FIOS program 101 may include instructions to a) receive an incoming I/O request involving the media device 118 from the application 103, b) create a tree structure configured to form an optimal order of processing for the I/O request by determining the location and data dependencies of chunks (i.e. portions) of data to be transferred, c) insert the incoming I/O request into a schedule embodied in the memory 106, wherein a position of the incoming I/O request within the schedule depends at least partly on the order of processing of the tree structure and d) implement the I/O request according to the schedule and tree structure.

The client system 100 may also include well-known support functions 110, such as input/output (I/O) elements 111, power supplies (P/S) 112, a clock (CLK) 113, and cache 114. The client device 100 may further include a fast storage device 115 such as a hard disk drive that provides non-volatile storage for applications and data. The fast storage device 115 may be used, among other things, for temporary or long-term storage of files 116 retrieved from a slower media device 118. Files 116 on the fast storage device 115 may additionally come from sources other than the slower media device 118. For example, the files 116 may include, but are not limited to, operating system files, temporary files created by an application, user data such as photos/audio/video, downloaded content, and more. By way of example, the storage device 115 may be a fixed disk drive, removable disk drive, flash memory device, or tape drive. The slower media device 118 may be a high-capacity optical disk drive, e.g., a CD-ROM drive, DVD-ROM drive, high-definition digital versatile disc (HD-DVD) drive, a Blu-Ray disc drive, a UMD drive, or other optical storage devices. Pre-fetched files 116 from the media device 118 may be temporarily stored in the storage 115 in a hardware cache for quick loading into the memory 106.

One or more user input devices 120 may be used to communicate user inputs from one or more users to the system 100. By way of example, one or more of the user input devices 120 may be coupled to the client device 100 via the I/O elements 111. Examples of suitable input devices 120 include keyboards, mice, joysticks, touch pads, touch screens, light pens, still or video cameras, and/or microphones. The client device 100 may include a network interface 125 to facilitate communication via an electronic communications network 127. The network interface 125 may be configured to implement wired or wireless communication over local area networks and wide area networks such as the Internet. The system 100 may send and receive data and/or requests for files via one or more message packets 126 over the network 127.

The system may further comprise a graphics subsystem 130, which may include a graphics processing unit (GPU) 135 and graphics memory 140. The graphics memory 140 may include a display memory (e.g., a frame buffer) used for storing pixel data for each pixel of an output image. The graphics memory 140 may be integrated in the same device as the GPU 135, connected as a separate device with the GPU 135, and/or implemented within the memory 106. Pixel data may be provided to the graphics memory 140 directly from the CPU 105. Alternatively, the CPU 105 may provide the GPU 135 with data and/or instructions defining the desired output images, from which the GPU 135 may generate the pixel data of one or more output images. The data and/or instructions defining the desired output images may be stored in memory 106 and/or graphics memory 140. In an embodiment, the GPU 135 may be configured with 3D rendering capabilities for generating pixel data for output images from instructions and data defining geometry, lighting, shading, texturing, motion, and/or camera parameters for a scene. The GPU 135 may further include one or more programmable execution units capable of executing shader programs.

The graphics subsystem 130 may periodically output pixel data for an image from the graphics memory 140 to be displayed on a video display device 150. The video display device 150 may be any device capable of displaying visual information in response to a signal from the system 100, including CRT, LCD, plasma, and OLED displays. The computer system 100 may provide the display device 150 with an analog or digital signal. By way of example, the display 150 may include a cathode ray tube (CRT) or flat panel screen that displays text, numerals, graphical symbols or images. In addition, the display 150 may include one or more audio speakers that produce audible or otherwise detectable sounds. To facilitate generation of such sounds, the client device 100 may further include an audio processor 155 adapted to generate analog or digital audio output from instructions and/or data provided by the CPU 105, memory 106, and/or storage 115.

The components of the system 100, including the CPU 105, memory 106, support functions 110, data storage device 115, media device 118, user input devices 120, network interface 125, and audio processor 155 may be operably connected to each other via one or more data buses 160. These components may be implemented in hardware, software, firmware, or some combination of two or more of these.

Figure 2:
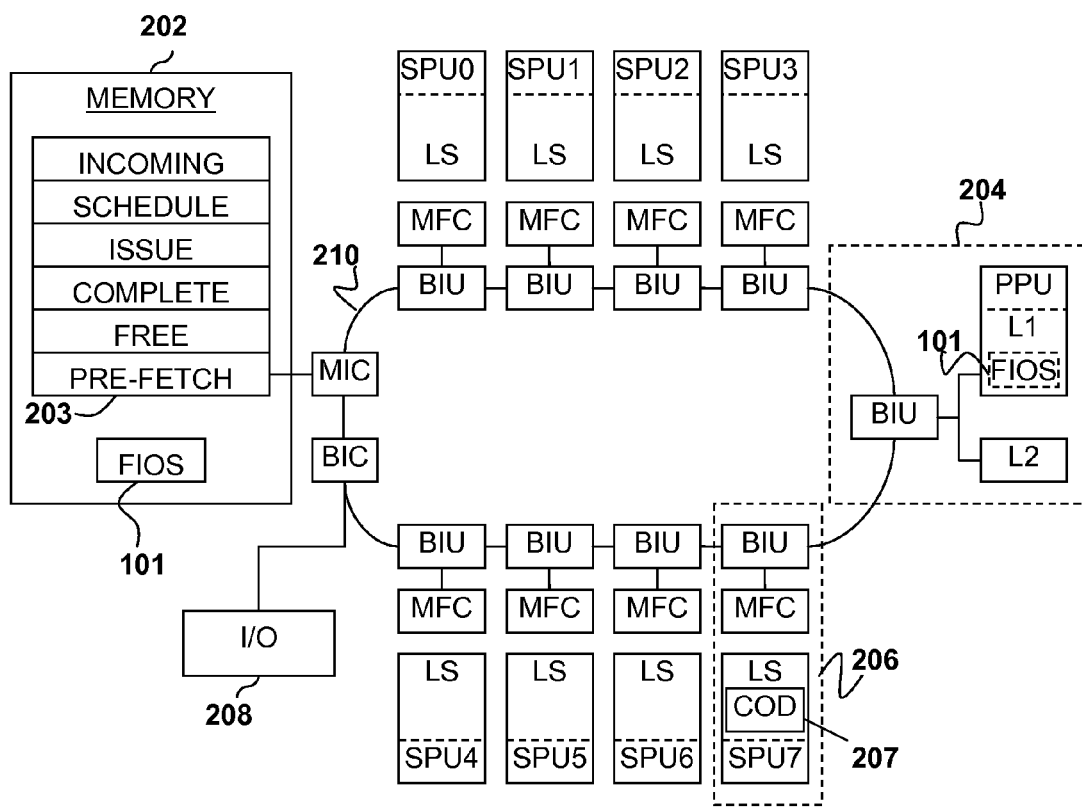
FIG. 2 is a block diagram of an alternative system that implements a FIOS according to an alternative embodiment of the present invention.

Some embodiments of the present invention may take advantage of a cell processor architecture or similar processor architecture. FIG. 2 illustrates a cell processor 200 configured to implement a FIOS according to an embodiment of the present invention. The cell processor 200 includes a main memory 202, a single power processor element (PPE) 204, and eight synergistic processor elements (SPE) 206. By way of example, the PPE 204 may include a 64-bit Power PC Processor Unit (PPU) with associated caches. Some implementations, e.g., CBEA-compliant systems may include a vector multimedia extension unit in the PPE 204. The PPE 204 may be a general-purpose processing unit that can access system management resources (such as memory-protection tables). Hardware resources may be mapped explicitly to a real address space as seen by the PPE 204. Therefore, the PPE 204 may address any of these resources directly by using an appropriate effective address value. A primary function of the PPE 204 is the management and allocation of tasks for the different SPEs 206. The PPU may execute coded instructions of a FIOS program 101.

The SPEs 206 are less complex computational units than the PPE 204, in that they need not perform any system management functions. Each SPE 206 includes a processor unit, sometimes referred to as a synergistic processor unit (SPU) and an associated local store (LS). The SPE 206 may generally have a single instruction, multiple data (SIMD) capability and typically process data and initiate any required data transfers (subject to access properties set up by the PPE 204) in order to perform their allocated tasks. An SPE 206 may store in its local store instructions 207 that implement portions of the FIOS program 101. The purpose of the SPE 206 is to enable applications that require a higher computational unit density and can effectively use the provided instruction set. Although 8 SPEs are shown in this example, the cell processor 200 may be configured with any number of SPEs. With respect to FIG. 2, the memory 202, PPE 204, and SPE 206 can communicate with each other and with an I/O device 208 over a ring-type element interconnect bus 210. The memory 202 may be accessed by the PPE 204 and SPEs 206 via a memory interface controller (MIC).

The memory 202 may contain I/O queues 203, e.g., incoming, schedule, issue, complete, free, and pre-fetch queues as described below. The memory 202 may also contain portions of a FIOS program 101 having features in common with the FIOS program 101 described herein. The PPE 204 may include an internal cache (L1) and external cache (L2). The PPE may store portions of the FIOS program 101 in its internal cache (L1). The FIOS program 101 and the SPE implemented file transfer instructions 207, or portions thereof, may also be stored in memory 202 for access by the SPE 206 and PPE 204 when needed.

Figure 3:
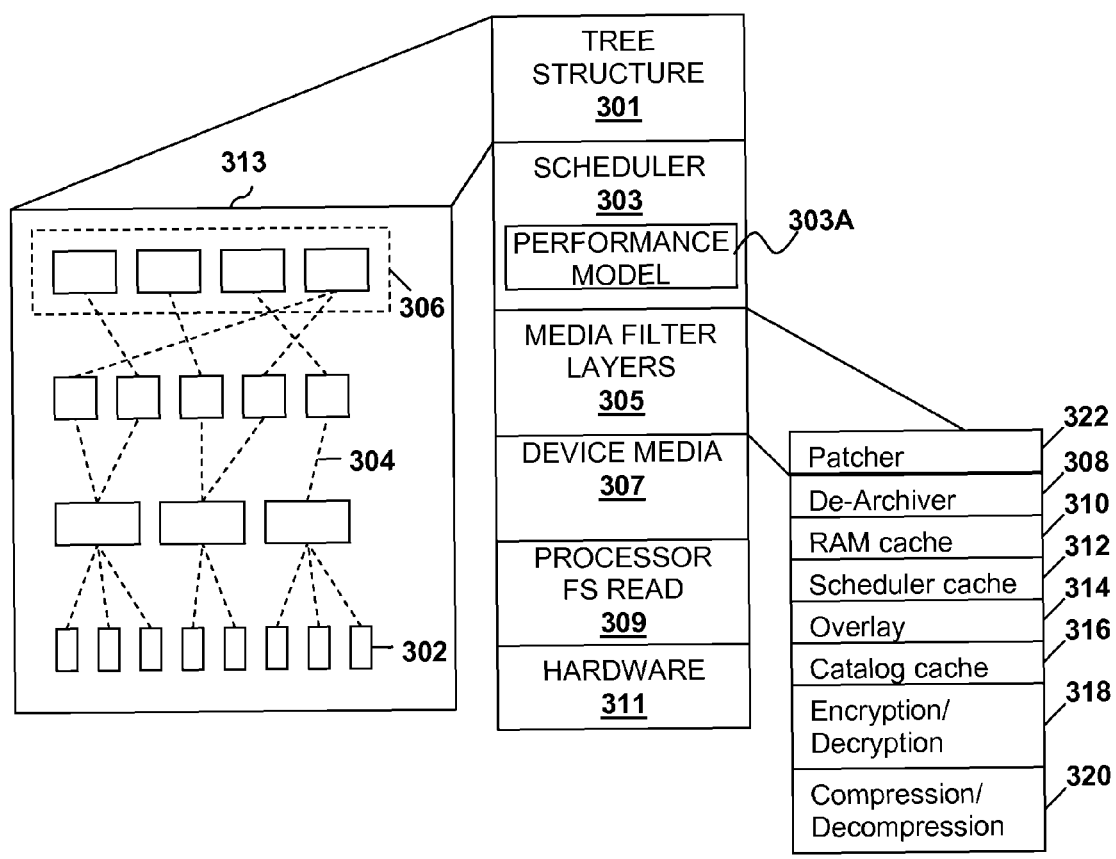
FIG. 3 is a block diagram of file input/output system (FIOS) software according to an embodiment of the present invention.

By way of example, the FIOS program 101 may include a media stack 300 to facilitate interfacing with hardware such as the storage device 115 or media device 118 as shown in FIG. 3. A media stack 300 may include a tree structure layer 301, a scheduler 303, one or more media filter layers 305, a device media layer 307, a processor file system (FS) read layer 309, and a hardware layer 311.

The tree structure layer 301 creates a map to facilitate optimal processing of the data associated with an individual I/O request to be transferred. Initially, a tree structure 313 is created that defines one or more layers of processing 306 (e.g., decryption, decompression, de-archiving, etc.) associated with a given I/O request. The data to be transferred or received per I/O request is processed at each layer 306 of the tree structure 313 and the tree structure 313 is configured to not begin a subsequent layer of processing until enough of the data in a previous layer has been processed. The tree structure 313 then breaks the data to be transferred or received into one or more chunks 302 at each of the one or more layers of processing 306. The chunks 302 associated with a particular layer of processing 306 have one or more sizes corresponding to that particular layer of processing 306. The chunk sizes for different layers may be different. The tree structure 313 forms an optimal order of processing the chunks for the different layers by determining the location of each chunk 302 and the data dependencies 304 between chunks 302 of different layers of processing 306.

By way of example, and not by way of limitation, an I/O request may include receiving data that is encrypted and compressed. Initially the tree structure creates two layers of processing, including a decryption layer and a decompression layer in order to fulfill the I/O request. In this example, the data to be transferred needs to be decompressed before it can be received by the application and the data to be transferred needs to be decrypted before it can be decompressed. The tree structure layer 301 breaks down the data to be transferred into chunks (i.e., portions of the data) depending on the layer of processing. In particular, the tree structure 301 generates instructions to break up the data into chunks with sizes that are selected so that portions of data may be processed simultaneously rather than having to wait for an entire piece of data to finish a level of processing before the next level of processing may begin. Each instruction for a given chunk may define the chunk by a path name, an offset, and a length.

For example, decryption may be accomplished at a fixed 64K chunk size, and so the tree structure layer 301 may break the data into 64K chunks for decryption. Decompression, however, may be processed in variable size chunks, and so the tree structure layer may break the data into chunks of variable sizes for decompression.

The decompression (de-archiver transform) process may take in a variable sized compressed and decrypted chunk and decompresses it to an uncompressed chunk of fixed size. The tree structure layer 301 or media filter layers 305 may be configured to determine which variable-sized chunks of the compressed and decrypted data decompress to fixed-sized chunks without having to decompress them first. To facilitate determination of the variable length of the encrypted chunk at the time of chunking the media filter layers 305 (which ultimately determine which chunks are created) may store in RAM whatever information they need to compute the size and location of a given chunk. For example, for a FIOS psarc file, a de-archiver layer may keep the psarc file's table of contents (TOC) in RAM. The TOC may contain a table that lists the size of every compressed block in the file, and the de-archiver media layer can derive the block's location from that. So effectively, the de-archiver is able to translate the incoming request for an uncompressed data block into a request for the corresponding compressed data block. The only information the de-archiver needs to do this transformation is the TOC, which it has in RAM. The de-archiver does not need to actually read or decompress any data to create the tree node.

Because the chunk sizes of the decryption layer and the chunk sizes of the decompression layer do not line up, a given decrypted chunk may not always be decompressed right away. Instead, more than one decryption layer chunk may need to be decrypted before a decompression layer chunk may begin being decompressed. An optimal order of processing is then established by determining the location of chunks associated with each layer and determining the data dependencies between chunks of different layers. This way, rather than waiting for an entire layer of processing to complete before the subsequent layer of processing may begin, a subsequent layer of processing may begin as soon as the necessary chunks of data in the previous layer are processed (e.g., decompression of a given chunk may begin once the necessary decryption level chunks have finished being decrypted).

Occasionally, an I/O request may require data to be retrieved from more than one media/storage device. Thus, by determining data dependencies prior to execution, processing an I/O request with data from multiple media/storage devices may be done simultaneously rather than having one media/storage device sit idle while the other media/storage device is processing its portion of the I/O request. By way of example, and not by way of limitation, a given I/O request may require data retrieval from both a hard disk (HD) and a Blu-Ray media device. By outlining the data dependencies for the given I/O request, it may be determined what exactly is needed from the HD and what exactly is needed from the Blu-Ray. This way, when the tree structure determines it allowable, data from both devices may be processed simultaneously rather than having one device sit idle while data from the other device is being processed.

Once the tree structure 313 has been created, the scheduler 303 then may insert the instructions of the tree structure that make up the incoming I/O request into a schedule embodied in the memory. The position of a given instruction within the schedule depends at least partly on the order of processing associated with the tree structure 313.

If two or more different I/O requests in the schedule contain similar tree structures 313, these I/O requests may be interleaved such that more than one request may be processed at the same time. This may improve the efficiency of fulfilling I/O requests because related I/O requests may be completed at the same time or with overlapping times, rather than waiting for each I/O request to finish processing before the next one begins processing. For example, in some embodiments, one or more instructions from other I/O requests that have been interleaved with the instructions of the tree structure 313 may be executed in parallel with execution of the instructions of the tree structure 313.

By way of example, and not by way of limitation I/O requests may be interleaved if the scheduler 303 determines that the requests will be serviced faster if they are interleaved. This may be illustrated by the following two examples.

According to a first example, suppose that two patched reads are executing simultaneously. File A needs five chunks: (A1) (A2) (P1) (A3) (P2). File B needs four chunks: (B1) (P3) (B2) (B3). "P" in this case stands for a patch file, and "A" and "B" are the original data files. The on-disk layout may look like this:

... (A1)(A2)(A3) ... (B1)(B2)(B3) ... (P1)(P2) ....

Note that because of the proximity of the files on the disk, the scheduler 303 may determine that fastest way to finish both reads with minimal seeking may be to interleave the requests by reading A1-A3 first, then B1-B3, then P1-P3.

According to a second example suppose that the scheduler 303 has scheduled a first read request and a second high-priority low-latency read request (e.g., an audio request) is scheduled. The FIOS 101 may start working on chunks from the first read as depicted in Table I below. In Table I, chunks move to the left over time; they start in the queue, move to execution, and finally finish up completely.

TABLE I

| done | executing | in queue |
|------|-----------|----------|
|      |           | (A1) (A2) (A3) (A4) (A5) (A6) (A7) (A8) |

After execution of A3 has started, the queue looks may look as depicted in Table II below:

TABLE II

| done | executing | in queue |
|------|-----------|----------|
| (A1) (A2) | (A3) | (A4) (A5) (A6) (A7) (A8) |

Suppose now that an audio thread comes in and suddenly wants to load (B1) and (B2). If audio reader requests immediate servicing, the scheduler 303 may put the reads of (B1) and (B2) at the front of the queue. The queue may now appear as shown in Table III below:

TABLE III

| done | executing | in queue |
|------|-----------|----------|
| (A1) (A2) | (A3) | (B1) (B2) (A4) (A5) (A6) (A7) (A8) |

Finally when this part of the queue is finished executing it may be seen that the I/O has been interleaved for the two read requests as shown in Table IV.

TABLE IV

| done | executing | in queue |
|------|-----------|----------|
| (A1) (A2) (A3) (B1) (B2) (A4) (A5) (A6) (A7) (A8) | | |

The device media layer 307 (sometimes called the media access layer) may be configured to respond to media requests received from the media filter layers 305 above, retrieving the requested data, then sending its reply back up the stack 300.

The media filter layers 305 may include, a patcher 322 a de-archiver layer 308, a RAM cache layer 310, a scheduler cache layer 312, an overlay layer 314, a catalog cache layer 316, a encryption/decryption layer 318, and a compression/de-compression layer 320. These media filter layers 305 correspond to the processing layers 306 associated with the tree structure 313. A given piece of data associated with an I/O request may have multiple processing layers depending on the number of media filter layers associated with data. The de-archiver 308 may be used to facilitate extraction of specific asset files from compressed archives. The RAM cache layer 310 may be used to implement caching of data, e.g., in the main memory. The scheduler cache 312 may be a simple disc-to-disc cache for temporarily storing data from a slower source such an optical disc. As used herein, the term "scheduler cache" refers to temporary data storage in a storage medium that is faster to access then the media device. It is not necessary for all data in the scheduler cache 312 to be pre-fetched; some may be fetched on-demand and copied into the cache. By way of example, and not by way of limitation, the scheduler cache layer 312 may utilize the fast storage medium to provide such temporary storage. In the particular case where the fast storage medium is a hard disk drive (HDD), the scheduler cache 312 is sometimes referred to as an HDD cache.

The scheduler cache 312 may be kept as a single file or as multiple files. In addition, the contents of the scheduler cache 312 need not be whole files. A multiple-file cache may be partially flushed by deleting some of the individual files to intelligently free up disk space when needed without sacrificing too much data. Single-file caches, by contrast, typically can only be truncated or entirely deleted. Single-file caches may provide higher performance than multi-file caches since a multi-file cache typically requires additional bookkeeping work (inside the host file system itself), which may require extra I/O.

The overlay layer 314 may be used to allow arbitrary overlaying of files and directories at the file system level as discussed below. The catalog cache layer 316 may be used to cache data that the O/S for the processor unit or cell processor may not properly cache (e.g., file existence, size, and location). The encryption/decryption layer 318 may be used to facilitate encryption or decryption of data for transfer. The compression/decompression layer 320 may be used to facilitate compression or decompression of data for transfer.

Operation of the tree structure layer 301 and the scheduler 303 of the FIOS program 101 may be understood with respect to FIG. 4, which is described below. From a client's point of view, an I/O request 403 may be serviced in a relatively straightforward manner. For example, a thread 402 within an application 401, such as a video game may request I/O through the FIOS program 101 by calling a function (e.g., readFile( )). The function may specify a priority for the I/O request 403 and a deadline by which the request 403 should be completed. The FIOS media stack 300 then uses the tree structure layer 301 to create a tree structure 313 for the I/O request 403 that forms a map defining an optimal order of processing for that I/O request 403.

The tree structure initially defines the levels of processing 306 associated with a given I/O request 403. For example, a given I/O request 403 may ask to transfer data from the processor to the media device, wherein the data needs to be compressed, encrypted, and archived. In this situation, the tree structure 313 will define three levels 306 of processing for the compression, encryption, and archiving of the data associated with the I/O request 403. A given piece of data must be compressed before it is encrypted, encrypted before it is archived, and archived before it is finally transferred to the media device.

The tree structure 313 then breaks the data to be transferred into chunks 302 according to the level of processing 306 (e.g., data is broken into 64K chunks at the compression level, data is broken into variable size chunks at the encryption level, and data is broken in 64K chunks at the archiving level). The data is broken up into chunks 302, so that portions of data at any given level or at different levels may be processed simultaneously rather than having to wait for all of the data in the request to finish a level of processing 306 before the next level of processing 306 may begin. Because the chunks 302 of one processing level 306 do not necessarily line up with the chunks 302 of another processing level 306, data dependencies 304 of chunks 302 corresponding to different levels of processing 306 must be mapped in order to streamline the processing of the I/O request 403. For example, a given compression level chunk may not always begin encryption as soon as compression has finished. Because the encryption level is processed at variable sizes, two or more compression level chunks may have to be compressed before an encryption level chunk may begin encryption. Thus, it is necessary for the tree structure 313 to determine these data dependencies 304 to optimize the processing of a given I/O request 403. Moreover, when the I/O request requires retrieval of data from multiple media/storage devices, the data dependencies 304 outlined in the tree structure 313 may allow for simultaneous processing of data from different media/storage devices, rather than having data from one media/storage device processed while the other media/storage device sits idle.

The final product associated with the tree structure 313 is a map defining an optimal order of processing for a given I/O request 403. Regardless of the optimization of the schedule of I/O requests, each I/O request 403 is individually optimized by the tree structure 313 so that it may be completed in the shortest amount of time possible. This I/O request 403 and its associated tree structure 313 are then fed to the scheduler 303 for efficient scheduling.

It is important to note that the data associated with an I/O request may have many more layers of processing than the two described above. The tree structure does not actually service the I/O request, but only creates a map of how the individual I/O request may most optimally be serviced.

By way of example, and not by way of limitation, an I/O request may be broken into a tree structure in which each chunk of data at each layer in processing the request is handled by a corresponding instruction. A given instruction within a layer of the tree structure may have associated data dependencies indicating one or more instructions from a previous layer that must be completed before the given instruction can begin execution.

Table V provides an example of a tree structure for an I/O request. In Table I, each instruction uses data identified by a path name, offset and length in kilobytes (KiB). In this example, the order of processing of the layers within the tree structure is from bottom to top. However, the instructions within the tree structure may be executed in parallel to the extent that data dependencies are satisfied. In Table V, the dependency for a given instruction indicates which other instruction(s) must be completed from the layer below before the given instruction may begin execution. In this example, pathnames beginning with /dev_refer to media devices. Specifically, /dev_hdd0 and /dev_hdd1 refer to hard disk drives and /dev_bdvd0 refers to a high-definition digital video drive (DVD). Pathnames not beginning with /dev_refer to virtual files which are composed of data retrieved by other instructions.

TABLE V

| Instruction # | (name, offset, length (KiB)) | dependency |
|---|---|---|
| 0 | (/userfile.dat, 0, 1200) | 1, 2, 3, 4 |
| | Patcher Chunking Layer | |
| 1 | (/userfile.dat, 0, 400) | 5-11 |
| 2 | (/xxx.pspatch, 1, 1) | 12 |
| 3 | (/userfile.dat, 800, 400) | 13-19 |
| 4 | (/xxx.pspatch, 2, 399) | 12, 20-25 |

TABLE V-continued

| Instruction # | (name, offset, length (KiB)) | dependency |
|---|---|---|
| De-archiver Chunking Layer | | |
| 5 | (/userfile.dat, 0, 64) | 26 |
| 6 | (/userfile.dat, 64, 64) | 27 |
| 7 | (/userfile.dat, 128, 64) | 28 |
| 8 | (/userfile.dat, 192, 64) | 29 |
| 9 | (/userfile.dat, 256, 64) | 30 |
| 10 | (/userfile.dat, 320, 64) | 31 |
| 11 | (/userfile.dat, 384, 64) | 32 |
| 12 | (/xxx.pspatch.dat, 0, 64) | 33 |
| 13 | (/userfile.dat, 768, 64) | 34 |
| 14 | (/userfile.dat, 384, 64) | 35 |
| 15 | (/userfile.dat, 384, 64) | 36 |
| 16 | (/userfile.dat, 384, 64) | 37 |
| 17 | (/userfile.dat, 384, 64) | 38 |
| 18 | (/userfile.dat, 384, 64) | 39 |
| 19 | (/userfile.dat, 384, 64) | 40 |
| 20 | (/xxx.pspatch.dat, 64, 64) | 41 |
| 21 | (/xxx.pspatch.dat, 128, 64) | 42 |
| 22 | (/xxx.pspatch.dat, 192, 64) | 43 |
| 23 | (/xxx.pspatch.dat, 256, 64) | 44 |
| 24 | (/xxx.pspatch.dat, 320, 64) | 45 |
| 25 | (/xxx.pspatch.dat, 384, 64) | 46 |
| De-archiver Transform Layer (decompression) | | |
| 26 | (game.psarc, 500, 27) | 47-48 |
| 27 | (game.psarc, 527, 35) | 48 |
| 28 | (game.psarc, 562, 31) | 48 |
| 29 | (game.psarc, 593, 17) | 48 |
| 30 | (game.psarc, 610, 50) | 48-49 |
| 31 | (game.psarc, 660, 38) | 49 |
| 32 | (game.psarc, 698, 34) | 49 |
| 33 | (patch.psarc, 100, 19) | 50 |
| 34 | (game.psarc, 1132, 18) | 51 |
| 35 | (game.psarc, 1150, 18) | 51-52 |
| 36 | (game.psarc, 1182, 29) | 52 |
| 37 | (game.psarc, 1211, 29) | 52 |
| 38 | (game.psarc, 1240, 64) - uncompressed | 52-53 |
| 39 | (game.psarc, 1304, 40) | 53 |
| 40 | (game.psarc, 1442, 39) | 53 |
| 41 | (patch.psarc, 119, 64) - uncompressed | 50, 54 |
| 42 | (patch.psarc, 183, 50) | 54 |
| 43 | (patch.psarc, 233, 17) | 54 |
| 44 | (patch.psarc, 250, 26) | 54-55 |
| 45 | (patch.psarc, 276, 35) | 55 |
| 46 | (patch.psarc, 311, 15) | 55 |
| Ram Cache Layer (128 KiB blocks) | | |
| 47 | (game.psarc, 384, 128) | 56 |
| 48 | (game.psarc, 512, 128) | 57 |
| 49 | (game.psarc, 640, 128) | 58 |
| 50 | (patch.psarc, 0, 128) | 59 |
| 51 | (game.psarc, 1024, 128) | 60 |
| 52 | (game.psarc, 1152, 128) | 61 |
| 53 | (game.psarc, 1280, 128) | 62 |
| 54 | (patch.psarc, 128, 128) | 63 |
| 55 | (patch.psarc, 256, 128) | 64 |
| Decryption Layer (128 KiB blocks) | | |
| 56 | (game.psarc, 384, 128) | 65 |
| 57 | (game.psarc, 512, 128) | 66 |
| 58 | (game.psarc, 640, 128) | 67 |
| 59 | (patch.psarc, 0, 128) | 68 |
| 60 | (game.psarc, 1024, 128) | 69 |
| 61 | (game.psarc, 1152, 128) | 70 |
| 62 | (game.psarc, 1280, 128) | 71 |
| 63 | (patch.psarc, 128, 128) | 72 |
| 64 | (patch.psarc, 256, 128) | 73 |
| Overlay Layer (path translation) | | |
| 65 | (/dev_bdvd/game.psarc, 384, 128) | 74 |
| 66 | (/dev_bdvd/game.psarc, 512, 128) | 75 |
| 67 | (/dev_bdvd/game.psarc, 640, 128) | 76 |
| 68 | (/dev_hdd/game.psarc, 0, 128) | 77 |
| 69 | (/dev_bdvd/game.psarc, 1024, 128) | 79 |
| 70 | (/dev_bdvd/game.psarc, 1152, 128) | 81 |
| 71 | (/dev_bdvd/game.psarc, 1280, 128) | 83 |

TABLE V-continued

| Instruction # | (name, offset, length (KiB)) | dependency |
|---|---|---|
| 72 | (/dev__hdd/game.psarc, 128, 128) | 96 |
| 73 | (/dev__hdd/game.psarc, 256, 128) | 97 |
| | HDD cache Layer (Decide hit/fill/readthru) | |
| 74 | (/dev__hdd1/cache.dat, 16384, 128) hit | |
| 75 | (/dev__hdd1/cache.dat, 16512, 128) hit | |
| 76 | (/dev__hdd1/cache.dat, 16640, 128) hit | |
| 77 | (/dev__hdd0/patch.psarc, 0, 128) RT | |
| 78 | (/dev__hdd1/cache.dat, 17024, 128) write fill | 94, 79 |
| 79 | (/dev__bdvd/game.psarc, 1024, 128) read fill | |
| 80 | (/dev__hdd1/cache.dat, 17152, 128) write fill | 94, 81 |
| 81 | (/dev__bdvd/game.psarc, 1152, 128) read fill | |
| 82 | (/dev__hdd1/cache.dat, 17280, 128) write fill | 94, 83 |
| 83 | (/dev__bdvd/game.psarc, 1280, 128) read fill | |
| 84 | (/dev__hdd1/cache.dat, 17408, 128) write fill | 94, 85 |
| 85 | (/dev__bdvd/game.psarc, 1408, 128) read fill | |
| 86 | (/dev__hdd1/cache.dat, 17536, 128) write fill | 94, 87 |
| 87 | (/dev__bdvd/game.psarc, 1536, 128) read fill | |
| 88 | (/dev__hdd1/cache.dat, 17664, 128) write fill | 94, 89 |
| 89 | (/dev__bdvd/game.psarc, 1664, 128) read fill | |
| 90 | (/dev__hdd1/cache.dat, 17792, 128) write fill | 94, 91 |
| 91 | (/dev__bdvd/game.psarc, 1792, 128) read fill | |
| 92 | (/dev__hdd1/cache.dat, 17920, 128) write fill | 94, 93 |
| 93 | (/dev__bdvd/game.psarc, 1920, 128) read fill | |
| 94 | (/dev__hdd1/cache.idxm 32, 1) write update //initial write of index marking block busy// | |
| 95 | (/dev__hdd0/patch.psarc, 128, 128) write update //final write of index marking block's VRW controls// | 80, 82, 84, 86, 88, 90, 92, 94 |
| 96 | (/dev__hdd0/patch.psarc, 128, 128) RT | |
| 97 | (/dev__hdd0/patch.psarc, 256, 128) RT | |

In the example presented in Table V, the I/O request is for a file from the DVD. The individual layers within the tree structure in this example are executed in a "bottom up" order. By this it is meant that at least some of the instructions in the lowest layer must be executed initially due to data dependencies. As used herein, the term "lowest layer" refers to that layer of the structure for which there is no previous (or lower) layer. By no previous (or lower) layer, it is meant that none of the instructions in the lowest layer has a data dependency requiring prior completion of execution of an instruction in a different layer. However, it is possible that one or more instructions in the lowermost layer may have data dependencies that require prior completion of execution of other instructions in the lowermost layer. In the example described with respect to Table I above, the lowest layer is the HDD cache layer. The exact order of servicing of the instructions in Table V may depend, to some extent on data dependencies within the instructions in the HDD cache layer. By way of example, the final I/O requests in the HDD cache layer from Table V may be sorted by device/partition into the order of execution shown in Table VI below.

TABLE VI

| Instruction # | (name, offset, length (KiB)) | dependency |
|---|---|---|
| 94 | (/dev__hdd1/cache.idxm 32, 1) write | |
| 74 | (/dev__hdd1/cache.dat, 16384, 128) read | |
| 75 | (/dev__hdd1/cache.dat, 16512, 128) read | |
| 76 | (/dev__hdd1/cache.dat, 16640, 128) read | |
| 78 | (/dev__hdd1/cache.dat, 17024, 128) write * | 94, 79 |
| 80 | (/dev__hdd1/cache.dat, 17152, 128) write * | 94, 81 |
| 82 | (/dev__hdd1/cache.dat, 17280, 128) write * | 94, 83 |
| 84 | (/dev__hdd1/cache.dat, 17408, 128) write * | 94, 85 |
| 86 | (/dev__hdd1/cache.dat, 17536, 128) write * | 94, 87 |
| 88 | (/dev__hdd1/cache.dat, 17664, 128) write * | 94, 89 |
| 90 | (/dev__hdd1/cache.dat, 17792, 128) write * | 94, 91 |
| 92 | (/dev__hdd1/cache.dat, 17920, 128) write * | 94, 93 |
| 95 | (/dev__hdd0/patch.psarc, 128, 128) write * | 78, 80, 82, 84, 86, 88, 90, 92 |
| 77 | (/dev__hdd0/patch.psarc, 0, 128) read | |
| 96 | (/dev__hdd0/patch.psarc, 128, 128) read | |
| 97 | (/dev__hdd0/patch.psarc, 256, 128) read | |
| 79 | (/dev__bdvd/game.psarc, 1024, 128) read | |
| 81 | (/dev__bdvd/game.psarc, 1152, 128) read | |
| 83 | (/dev__bdvd/game.psarc, 1280, 128) read | |
| 85 | (/dev__bdvd/game.psarc, 1408, 128) read | |
| 87 | (/dev__bdvd/game.psarc, 1536, 128) read | |
| 89 | (/dev__bdvd/game.psarc, 1664, 128) read | |
| 91 | (/dev__bdvd/game.psarc, 1792, 128) read | |
| 93 | (/dev__bdvd/game.psarc, 1920, 128) read | |

The instructions in Table VI could all be issued in parallel, with the exception of the ones with dependencies marked (*), which may be sorted and dispatched by the scheduler 303. Specifically, because index write instruction 94 and read instructions 77, 79, 81, 83, 85, 87, 89, 91, and 93 do not have any data dependencies these instructions may be executed in parallel and in any order. Write instructions 78, 80, 82, 84, 86, 88, 90, and 92 depend on the initial index write instruction 94 and read instructions 77, 79, 81, 83, 85, 87, 89, 91, and 93 respectively. Consequently each of these write instructions must wait until index write 94 and the corresponding read instruction have been executed.

The remaining instructions in the tree structure described by Table I above may be executed in parallel to the extent that data dependencies are satisfied. It is important to note that by including the data dependencies in a tree structure created immediately after receiving an I/O request each instruction in a given layer of the tree structure can be executed as soon as the data dependency requirements for that instruction have been met. Consequently, it is possible to execute instructions for two different layers in parallel as long as the data dependencies for each instruction have been met. Thus, an instruction at one layer need not wait for completion of all the instructions in the layer below.

For example, in order to execute I/O request instruction 0, patcher instructions 1, 2, 3, 4 must first be completed. Before patcher instruction 4 can be executed, only de-archiver instructions 12 and 20-25 must be completed. Before de-archiver instruction 25 can be executed, decompression instruction 46 only must be completed. Before decompression instruction 46 can begin, only ram cache instruction 55 must be completed. Before ram cache instruction 55 can begin only decryption instruction 64 must be completed. Before decryption instruction 64 can begin, only overlay instruction 73 must be completed. Before overlay instruction 73 can begin only HDD cache instruction 97 must be completed.

Once the I/O request 403 has passed through the tree structure layer 301, and an order of processing for that particular I/O request is determined, the I/O request 403 is moved to an incoming queue 404 by the scheduler 303. By way of example, the incoming queue 404 may be a first-in-first-out (FIFO) queue wherein the first request placed in the queue 404 is the first request scheduled by the scheduler 303. Insertion of the request 403 into the incoming queue 404 may be implemented by an atomic operation to prevent threads from being blocked when requesting asynchronous I/O. In some embodiments, the incoming queue 404 may be in the form of an atomic stack, which may be filled by the auxiliary processor 105B with an atomic exchange.

By way of example, and not by way of limitation, if the I/O request 403 is a read operation, the client application 401 may supply a buffer 405 to receive data retrieved from a media device. When the I/O request 403 is completed, the client application 401 may read the retrieved data from the buffer 405 it supplied. When the client is finished processing the I/O request 403, the client may de-allocate the buffer 405 so that its resources are available for future I/O use.

The I/O request 403 may activate the scheduler 303 if the scheduler 303 isn't already activated. The application 401 may then wait for the I/O request 403 to be completed. For example, the client application 401 may poll periodically using an atomic method (e.g., is Done( )). Alternatively, the client may wait for a callback function 411 that the FIOS program 101 calls when the I/O request 403 is completed.

After the I/O request 403 has been inserted into the incoming queue 404, the FIOS program 101 may invoke the scheduler 303 to perform a schedule insertion 407. The sequence of operations implemented by the scheduler 303 may be understood with reference to FIG. 5. The scheduler 303 may sleep (i.e., remain inactive) as indicated at 502 if there is no I/O to handle. When a new I/O request 403 enters the incoming queue 404, the scheduler 303 awakes to handle it. Once the scheduler 303 wakes up (or is already awake), it notices the new request 403 in the incoming queue 404 and it moves the request into an appropriate location in the scheduling queue 406.

To determine the queue position of the I/O request 403, the scheduler 303 may optionally determine a current state of the media device e.g., by querying the device media layer 307 or another layer in the FIOS media stack 300 as indicated at 503. The state data may vary depending on the type of media device handled by the FIOS media stack 300 and on the various layers present in the stack 300. Examples include the most-recently-accessed logical block address (LBA), the RAM cache's last-accessed path and offset, the current disc layer, the head position, streaming mode, and non-streaming mode.

According to embodiments of the present invention, the scheduler 303 may be based on media device performance model 303A. Unlike existing, I/O schedulers, the drive model 303A may take into account data regarding the performance of the media device 118 in determining an optimum scheduling of the request 403. Scheduling I/O requests 403 using a drive model may be compared to the inverse of the mastering process in generating a CD. The performance model 303A may be configured to take into account such factors as overhead, disk move time, read time, and the like. The performance model 303A may model arbitrarily complex characteristics of the media device 118, such as throughput, laser wiggles, read head movements, layer changes, and request overhead. The performance model 303A may also take into account other parameters of the particular medium being read or written to by the media device 118 involved in the I/O request. For example, the performance model 303A may consider whether the device is reading from a single layer disc or multiple layer disc, e.g., dual layer discs, such as a Blu-Ray DMD.

The scheduler 303 may also optionally look at the new I/O request's timing requirements (e.g., deadlines) and priority as indicated at 504. The scheduler may also optionally be configured to compare I/O requests in the incoming queue 404 to I/O requests in the schedule queue 406 for interleaving as indicated at 506. The data dependencies 304 outlined by the tree structure 313 of a given I/O request in the incoming queue 404 may have overlap with the data dependencies 304 outlined by the tree structures 313 of one or more I/O requests already in the schedule queue 406. For example, an I/O request in the incoming queue 404 may need to read a chunk of data from a given media device and an I/O request in the schedule queue 406 may need to read a neighboring chunk of data from the same media device. Thus by interleaving these two I/O requests, the efficiency of processing those I/O requests may be improved. The interleaving may be done by setting a threshold overlap value between two given tree structures 313 and interleaving the two I/O requests associated with those tree structures 313 when the threshold overlap value is met. If two or more I/O requests are interleaved, then the scheduler may treat these interleaved requests as a single request during scheduling.

Once it is determined whether any I/O requests may be interleaved, the scheduler 303 may determine the best queue location for the present I/O request as indicated at 507. The scheduler 303 may begin by placing the incoming I/O request into an arbitrary position of the schedule queue. The total time needed to complete the entire schedule, as well as priority considerations, and deadline constraints are then determined using this trial schedule queue. This process may be repeated iteratively with different queue orders until a best schedule queue order is determined, as indicated at 507. Note that the initial state for the request 403 may be determined from the ending state for the previous request in the schedule order and the initial state for the next request in the schedule order may be determined from the final state of the request 403.

The scheduler 303 may walk through the requests in the scheduling queue, comparing characteristics of the request 403 against those requests that are already in the queue. The scheduler 303 may try the request 403 at each possible location in the queue, looking for priority overrides, missed deadlines, and timing considerations. The scheduler 303 may determine a best possible new queue order by looking for an order in which no requested I/O operation misses its deadline.

If one or more requests must miss their deadlines, the scheduler may determine the queue order using different criteria. Additional criteria which may affect the ordering of the requests in the schedule queue 406 may include (but are not limited to) I/O request priorities, stream buffer states, latency requirements, and overlapping data dependencies between tree structures of different I/O requests.

In some embodiments, priorities may be used, e.g., if deadlines can't all be resolved. For example, if some deadlines will inevitably be missed, the best queue order may be one in which lowest-possible-priority requests miss their deadlines. If there are multiple possible queue orders which fit the previous consideration, then the queue order that has the lowest number of equal-priority deadline-missing requests may be the best order. If there are multiple possible queue orders in which all the previously described considerations are equal, then the queue order with the lowest possible time to execute the whole queue may be the best order. In some cases, a low priority request may be scheduled before a high priority request so long as the high priority request can meet its deadline.

If there are multiple possible queue orders in which all the previously described considerations are equal, then the order where the newest request in the schedule queue 406 goes to the end of the queue may be the best order.

Figure 4:
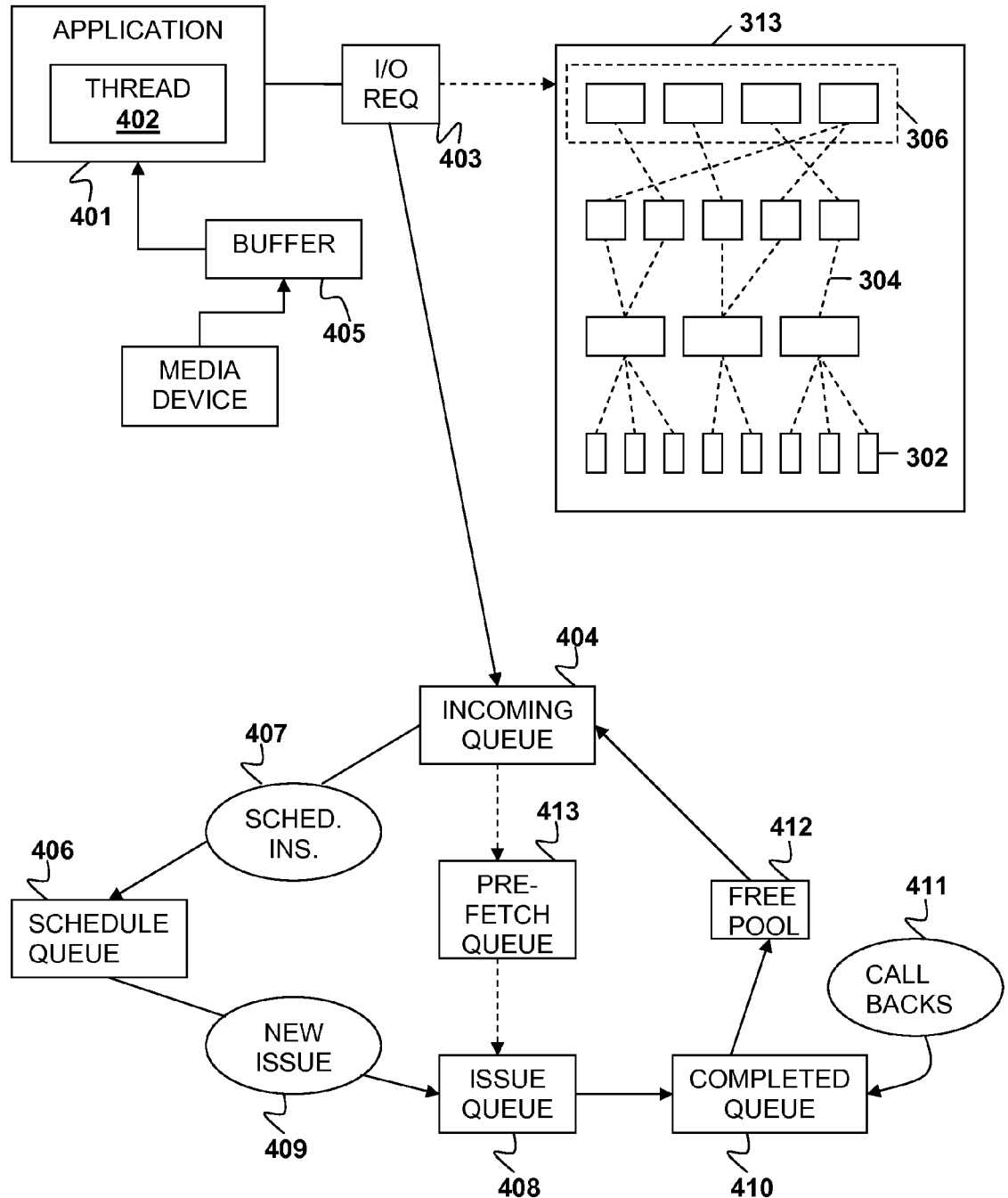
FIG. 4 is a data flow diagram illustrating a flow of operations in a FIOS according to an embodiment of the present invention.
Figure 5:
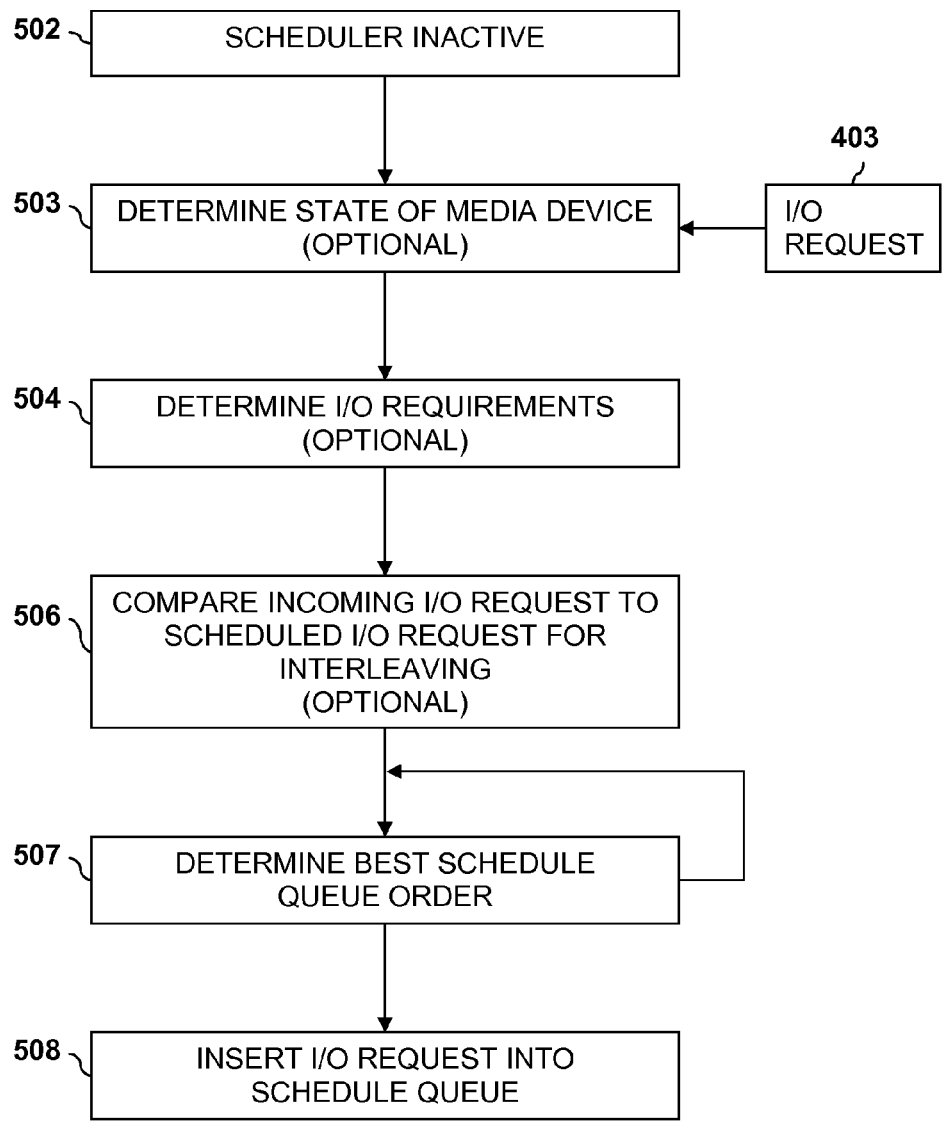
FIG. 5 is a flow diagram illustrating an example of a software scheduler used in a FIOS according to an embodiment of the present invention.

Once the scheduler 303 has determined the best position in the schedule queue 406 for fulfilling the request 403, the request may be inserted in there, as indicated at 407 in FIG. 4, and 508 in FIG. 5. Referring again to FIG. 4, if there are resources available to execute I/O requests, the scheduler 303 may move the first request in the schedule queue 406 to an issue queue 408 as indicated at 409. The request may then be executed from the issue queue 408. To execute a given I/O request 403, the scheduler 303 may pass the request 403 as well as the tree structure 313 associated with the given request 403 down to the first layers in the FIOS media stack 300.

Each layer below the scheduler 303 may see the I/O request 403 and corresponding tree structure passed to it by the layer above. If appropriate, a layer may process the chunks 304 of data associated with a request. Each layer processes the request 403 according to the tree structure 313 associated with the request 403, such that the request is processed in the most efficient manner possible. By way of example, and not by way of limitation, if the request is a read operation, the de-archiver layer 308 may check the supplied pathname against the contents of open archives, and, if it finds the file, may remap the request into a read of the compressed data. Each layer of the FIOS media stack 300 passes the processed or unprocessed I/O request to the next lower layer until the request finally reaches the hardware layer 310. When the hardware layer 310 responds to the request, the response goes through each layer in the media stack 300, from bottom to top, and each layer may process the chunks 302 of retrieved data if appropriate. For example, the de-compression layer may know that the chunk 302 of returned data must be decompressed, so it decompresses it before passing the response back up the stack 300. The response finally goes back to the scheduler 303.

When retrieved data comes back up the stack 300, the scheduler 303 may receive it and then move the I/O request 403 to a completed queue 410, which may trigger a callback function 411 to the application 401 (if the callback was set up by the application). Alternatively, the application 401 may poll the FIOS stack 300 to determine if an I/O request 403 has been completed. Once an I/O request 403 has been completed, it may be moved to a free I/O pool 412. The free I/O pool 412 may contain a set of I/O requests that are not in use. Such requests may include those that have never been allocated to a client application 401 or those that have been used by a client application 401 and then freed for use again. When a client application 401 makes an I/O request 403, the scheduler 303 may allocate an I/O request to the client from this pool 412. The free I/O pool 412 may be implemented as a stack. Free I/O requests may be popped from the free I/O pool 412 and pushed onto the incoming queue 404. In this manner, free I/O requests may be reused.

According to embodiments of the invention, the scheduler 303 may operate in a schedule loop, as follows:
1. Check for I/O completion
2. Issue new I/O requests
3. Issue I/O callbacks (if any)
4. Insertion to schedule (scheduling insertion from incoming)
5. New issues again.
6. Check for predicted missed deadlines.
7. Return to 1.

The number of scheduled insertions for each iteration may be limited to some maximum number, e.g., sixteen insertions.

In some embodiments of the invention, an auxiliary processor unit 105B (e.g., SPE 206) could request I/O on its own by adding a request for incoming I/O to the incoming queue 404 through an exchange that is atomic with respect to the main processor 105A or PPE 204. For example, in a conventional Cell processor implementation, an SPE 206 might not have any I/O facilities. However, if the incoming queue 404 is a common data element, an auxiliary processor 105B could add an I/O request to the queue through a standard atomic exchange with the main processor 105A and signal the main processor 105A.

In many prior art implementations, if an auxiliary processor 105B needs data for immediate processing, that data has to be in main memory. With embodiments of the present invention, by contrast, the auxiliary processor 105B may trigger the FIOS media stack 300 to go get needed data from the hard media device 118 or even over the network 127.

By way of example, and not by way of limitation, the incoming queue 404, completed queue 410 and free I/O pool 412 may be atomic stacks. The auxiliary processor 105B may pop an I/O request from the free I/O pool 412, fill out a path for the I/O request, push the request back into the incoming queue 404 and then perform synchronization and wake up the scheduler 302. The auxiliary processor 105B may do other work while intermittently polling for completion of the I/O request.

By way of example, in the cell processor system 200, an I/O request may be serviced by an SPE 206. The data requested by the SPE 206 may be sent to anyplace addressable by the PPE 204. If the SPE 206 were locked, the FIOS media stack 300 could write the data directly to the local store (LS) of the SPE 206. In some embodiments, one SPE 206 may request the de-compression layer to do decompression with another SPE. This may be implemented, e.g., using a remote procedure call (RPC) between processors. In this example, an SPE 206 asks the PPE 204 to do something for it. In a more conventional RPC, it's the other way around.

In some embodiments, the scheduler cache layer 312 (e.g. a HDD cache) may be used to pre-fetch a file from the media device 118 into the cache 117 in the storage device 115 so that the file can be read quickly later on. In such a case, a pre-fetch operation 413 may be inserted directly into the issue queue 408. The pre-fetch may be a standard manual pre-fetch which has been implemented by many types of caches, such as the "dcbt" instruction in the PowerPC CPU architecture. According to embodiments of the invention, the pre-fetches may be queued and executed as part of the scheduler loop described above. Pre-fetching may facilitate work with relatively slow source media (e.g., Blu-Ray and UMD) with relatively high latency and low throughput that must be accessed while other I/O requests are being fulfilled.

The scheduler 302 may be configured to implement such pre-fetching at a relatively low priority so that it will only run in the unused moments when the media device 118 would otherwise be idle, and won't interfere with other I/O requests. For example, the system 100 may have a slow media device 118 (e.g., an optical disc such as a Blu-Ray disc (BD) drive) and a faster storage device 115, such as a hard disk drive. The scheduler cache layer 305 may be used to asynchronously copy a file from the optical disc drive to the hard disc. When the file is accessed later it will be read at the higher HDD speed (e.g., 20 MiB/s) instead of the slower optical disc speed (e.g., 8 MiB/s).

Although cache pre-fetching is normally done to a hard disk cache, pre-fetching may also be done to main memory 106, 202. Pre-fetch requests may be included at the end of the schedule queue 406 in the order in which they are received after scheduling is complete. In some embodiments, pre-fetch requests may be delayed when necessary. Pre-fetch requests are not scheduled in the same manner as other I/O requests 403. Pre-fetch requests are held in a separate pre-fetch queue 413 which is only serviced when the schedule queue 406 is empty. A pre-fetch request may be delayed, if necessary. Otherwise, pre-fetches may be completed in the order in which they are received. The scheduler 303 may keep the pre-fetch requests queued and only execute them when the I/O subsystem has been idle for a specified length of time. This prevents pre-fetch requests from interfering with normal I/O requests. In addition, pre-fetches are also not limited to a single cache block, they may be any size, or even pass a special "whole-file" value which tells the cache to load an entire file from beginning to end. Furthermore, though pre-fetches may be any size, pre-fetches may be implemented such that no more than one cache block is filled before returning to the scheduler 303 to check that the FIOS media stack 300 continues to be idle.

Cache pre-fetching may provide improved I/O performance in I/O driven applications, such as video games and on platforms with specific I/O needs, such as modern video game consoles. In particular, the game data is often stored on a slow media such as an optical media or network file server, but the game may have access to fast local storage like HDD.

Embodiments of the present invention provide for improved I/O performance in applications and systems that utilize a significant amount of I/O. As discussed above, embodiments of the present invention are particularly useful in video game applications and video game systems. However, the embodiments of the invention or not limited to such applications and systems.

Other variations on the above described embodiments are within the scope of embodiments of the present invention. For example, in some implementations, patching of files by the patcher layer 322 may be implemented through the use of binary difference (binary diff) patches that are applied at runtime. By way of example, binary diff patches 119 may be stored in the storage device 115 and applied to the relevant files at runtime.

Traditionally patches have been applied by creating a whole new file by following executable instructions from a difference file that could be downloaded over a network. These instructions might indicate which bytes are to be removed from a file and which bytes are to be added to the file. The binary diff patches 119 stored in the storage device 115 may include such instructions. Patching has traditionally been done offline, i.e., not at runtime. In a typical traditional patch, an entire original file is read into memory from a storage device. Difference patches are applied to the file to generate a new file, which is then written back out to the storage device. Idea was to minimize size of patch to download.

Diff patches were developed at a time when download was carried out by 300 baud or 1200 baud modems. At that time it was important to reduce the size of the download. With the development of the Internet higher download speeds have become more widely available. It is a more common practice, therefore, to just transfer an entire file over the network and download it to the storage device 115 without using diff patch. This approach, though somewhat crude, is nevertheless effective.

However, in many applications, particularly video games, it is often necessary to patch very large files. Since an entire file must be loaded into memory in order to apply a patch, diff patching can potentially be slow for very large files. For example, reading a 1 Gig file from storage into memory may take more than a minute even before applying the patch.

Both prior art approaches to patching can present a problem due to bandwidth costs. The problem is particularly acute where a replacement file to be downloaded occupies a significant portion of the space available in the storage device 115. For example, downloading a 500 Megabyte patched file can take up a significant portion of a 20 Gigabyte hard drive.

Furthermore, situations may arise where several very large files require replacement of a very small amount of data. For example, an application may have several files with a bug in a 16 byte ID at the beginning of each file. However, because the patching only works at file size level, applying the patch by file replacement would mean downloading and replacing every single file in the application. This is unrealistic if the files amount to several gigabytes of data. Even if the files were patched with a traditional diff patch all of the files would have to be copied to in order to apply the patch.

To overcome these problems a binary diff patch may be generated and downloaded in the traditional way. However, instead of applying the patch offline, the patch may be applied at runtime, e.g., as part of servicing an I/O request from an application while the application is executing. It is noted that immediate chunking as described above, although advantageous, is not required in order to implement such binary diff patches at runtime.

Patches may be applied at a relatively early stage in the tree structure. For example, part of the initial processing of an incoming I/O request may involve checking a patch table to determine if there is a diff patch for any files listed in the request. This is similar to the de-archiver TOC lookup described above. The patch table, which may be stored in RAM, contains information needed by the FIOS 101 in order to determine how and where to apply the patches.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. Any element in a claim that does not explicitly state "means for" performing a specified function, is not to be interpreted as a "means" or "step" clause as specified in 35 USC §112, ¶ 6. In particular, the use of "step of" in the claims herein is not intended to invoke the provisions of 35 USC §112, ¶ 6.

Although the present invention has been described in considerable detail with reference to certain preferred versions thereof, other versions are possible. Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents incorporated herein by reference.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. In a system having a processor unit, a memory, and one or more media/storage devices, a method for handling input or output (I/O) to or from the one or more media/storage devices, comprising:
   a) receiving an incoming I/O request from an application running on the processor to transfer data to or receive data from the one or more media/storage devices;
   b) creating a tree structure including instructions executable by the processor and embodied in the memory that define one or more layers of processing associated with the I/O request, wherein the instructions divide the data in the I/O request into one or more chunks at each of the one or more layers of processing, wherein each instruction at one or more of the layers has an associated data dependency to one or more corresponding instructions in a previous layer, wherein the data dependency for a given instruction permits the given instruction to execute only after execution of a corresponding one or more dependent instructions in the previous layer;
   c) sorting the instructions in the tree structure into an order of processing by determining a location of each chunk and data dependencies between chunks of different layers of processing;
   d) inserting one or more instructions into a schedule embodied in the memory, wherein a position of the one or more instructions within the schedule depends at least partly on the order of processing; and
   e) servicing the I/O request by executing the instructions according to the schedule with the processor, wherein the instructions are executed by the processor according to the order of processing associated with the tree structure embodied in the memory.

2. The method of claim 1 wherein the chunks associated with a particular layer of processing have a different size than the chunks associated with another layer of processing.

3. The method of claim 1 wherein e) includes determining whether execution of a dependent instruction is completed before executing a given instruction having a data dependency.

4. The method of claim 1 wherein the tree structure includes a lowermost layer, wherein one or more instructions the lowermost layer has an associated data dependency to a different instruction in the lowermost layer, wherein the data dependency for a given instruction in the lowermost layer permits the given instruction to execute only after execution of a corresponding one or more dependent instructions in the lowermost layer.

5. The method of claim 1, wherein e) includes executing two or more instructions from a common layer of processing in parallel.

6. The method of claim 1, wherein e) includes executing two or more instructions from two or more different layers of processing in parallel.

7. The method of claim 1 wherein e) includes interleaving execution by the processor of one or more instructions from one or more other I/O requests among execution of the instructions of the tree structure.

8. The method of claim 7 wherein e) includes executing the one or more instructions from the one or more other I/O requests in parallel with execution of one or more instructions of the tree structure.

9. The method of claim 1, wherein the one or more layers of processing includes a de-archiving or archiving layer.

10. The method of claim 1, wherein the one or more layers of processing include a de-encryption or encryption layer.

11. The method of claim 1, wherein the one or more layers of processing include a de-compression or compression layer.

12. The method of claim 1, wherein insertion of the incoming I/O request within the schedule in d) further depends on a priority constraint associated with the I/O request.

13. The method of claim 1, wherein insertion of the incoming I/O request within the schedule in d) further depends on a deadline constraint associated with the I/O request.

14. The method of claim 1, wherein e) includes interleaving of two or more I/O requests, when the tree structures associated with the two or more I/O requests meet a threshold overlap value, prior to insertion into the schedule.

15. The method of claim 1 wherein e) includes applying a differential patch to one or more files at runtime.

16. A system for handling input/output (I/O), comprising:
   a processor unit;
   a memory coupled to the processor unit;
   one or more media/storage devices coupled to the processor unit; and
   a set of processor executable instructions embodied in the memory, the instructions being configured, when executed, to implement a method for handling input or output (I/O) to or from the one or more media/storage devices, the method comprising:
   a) receiving an incoming I/O request from an application running on the processor to transfer data to or receive data from the one or more media/storage devices;
   b) creating a tree structure including instructions executable by the processor and embodied in the memory that define one or more layers of processing associated with the I/O request, wherein the instructions divide the data in the I/O request into one or more chunks at each of the one or more layers of processing, wherein each instruction at one or more of the layers has an associated data dependency to one or more corresponding instructions in a previous layer, wherein the data dependency for a given instruction permits the given instruction to execute only after execution of a corresponding one or more dependent instructions in the previous layer;
   c) sorting the instructions in the tree structure into an order of processing by determining a location of each chunk and data dependencies between chunks of different layers of processing;
   d) inserting one or more instructions into a schedule embodied in the memory, wherein a position of the one or more instructions within the schedule depends at least partly on the order of processing; and e) servicing the I/O request by executing the instructions according to the schedule with the processor, wherein the instructions are executed by the processor according to the order of processing associated with the tree structure embodied in the memory.

17. The system of claim 16 wherein the chunks associated with a particular layer of processing have a different size than the chunks associated with another layer of processing.

18. The system of claim 16 wherein e) includes determining whether execution of a dependent instruction is completed before executing a given instruction having a data dependency.

19. The system of claim 16 wherein the tree structure includes a lowermost layer, wherein one or more instructions the lowermost layer has an associated data dependency to a different instruction in the lowermost layer, wherein the data dependency for a given instruction in the lowermost layer permits the given instruction to execute only after execution of a corresponding one or more dependent instructions in the lowermost layer.

20. The system of claim 16, wherein e) includes executing two or more instructions from a common layer of processing in parallel.

21. The system of claim 16, wherein e) includes executing two or more instructions from two or more different layers of processing in parallel.

22. The system of claim 16 wherein e) includes interleaving execution by the processor of one or more instructions from one or more other I/O requests among execution of the instructions of the tree structure.

23. The system of claim 22 wherein e) includes executing the one or more instructions from the one or more other I/O requests in parallel with execution of one or more instructions of the tree structure.

24. The system of claim 16, wherein the one or more layers of processing includes a de-archiving/archiving layer.

25. The system of claim 16, wherein the one or more layers of processing include a de-encryption/encryption layer.

26. The system of claim 16, wherein the one or more layers of processing include a de-compression/compression layer.

27. The system of claim 16, wherein insertion of the incoming I/O request within the schedule in d) further depends on a priority constraint associated with the I/O request.

28. The system of claim 16, wherein insertion of the incoming I/O request within the schedule in d) further depends on a deadline constraint associated with the I/O request.

29. The system of claim 16, wherein e) includes interleaving of one or more I/O requests, when the tree structures associated with the one or more I/O requests meet a threshold overlap value, prior to insertion into the schedule.

30. The system of claim 16 wherein e) includes applying a differential patch to one or more files at runtime.

31. A computer program product comprising:
a computer readable medium having computer readable program code embodied in said medium, the computer readable program code including computer executable instructions that, when executed, handle input or output (I/O) to or from one or more media/storage devices, said computer program product having:
a) computer executable program code means for receiving an incoming I/O request from an application running on the processor to transfer data to or receive data from the one or more media/storage devices;
b) computer executable program code means for creating a tree structure including instructions executable by the processor and embodied in the memory that define one or more layers of processing associated with the I/O request, wherein the instructions divide the data in the I/O request into one or more chunks at each of the one or more layers of processing, wherein each instruction at one or more of the layers has an associated data dependency to one or more corresponding instructions in a previous layer, wherein the data dependency for a given instruction permits the given instruction to execute only after execution of a corresponding one or more dependent instructions in the previous layer;
c) computer readable program code means for) sorting the instructions in the tree structure into an order of processing by determining a location of each chunk and data dependencies between chunks of different layers of processing;
d) computer readable program code means for inserting one or more instructions into a schedule embodied in the memory, wherein a position of the one or more instructions within the schedule depends at least partly on the order of processing; and
e) computer readable program code means for servicing the I/O request by executing the instructions according to the schedule with the processor, wherein the instructions are executed by the processor according to the order of processing associated with the tree structure embodied in the memory.

32. The computer program product of claim 31 wherein the chunks associated with a particular layer of processing have a different size than the chunks associated with another layer of processing.

33. The computer program product of claim 31 wherein e) includes computer readable program code means for determining whether execution of a dependent instruction is completed before executing a given instruction having a data dependency.

34. The computer program product of claim 31 wherein the tree structure includes a lowermost layer, wherein one or more instructions the lowermost layer has an associated data dependency to a different instruction in the lowermost layer, wherein the data dependency for a given instruction in the lowermost layer permits the given instruction to execute only after execution of a corresponding one or more dependent instructions in the lowermost layer.

35. The computer program product of claim 31 wherein e) includes computer readable program code means for executing two or more instructions from a common layer of processing in parallel.

36. The computer program product of claim 31 wherein e) includes computer readable program code means for executing two or more instructions from two or more different layers of processing in parallel.

37. The computer program product of claim 31 wherein e) includes computer readable program code means for interleaving execution by the processor of one or more instructions from one or more other I/O requests among execution of the instructions of the tree structure.

38. The computer program product of claim 37 wherein e) includes computer readable program code means for executing the one or more instructions from the one or more other I/O requests in parallel with execution of one or more instructions of the tree structure.

39. The computer program product of claim 31, wherein the one or more layers of processing includes a de-archiving or archiving layer.

40. The computer program product of claim 31, wherein the one or more layers of processing include a de-encryption or encryption layer.

41. The computer program product of claim 31, wherein the one or more layers of processing include a de-compression or compression layer.

42. The computer program product of claim 31, wherein insertion of the incoming I/O request within the schedule in e) further depends on a priority constraint associated with the I/O request.

43. The computer program product of claim 31, wherein insertion of the incoming I/O request within the schedule in e) further depends on a deadline constraint associated with the I/O request.

44. The computer program product of claim 31 wherein e) includes computer readable program code means for interleaving of one or more I/O requests, when the tree structures associated with the one or more I/O requests meet a threshold overlap value, prior to insertion into the schedule.

45. The computer program product of claim 31 wherein e) includes computer readable program code means for applying a differential patch to one or more files at runtime.

* * * * *